United States Patent [19]

Jensen

[11] Patent Number: 4,929,669
[45] Date of Patent: May 29, 1990

[54] ORGANOSILOXANE COMPOSITIONS YIELDING ELASTOMERS WITH IMPROVED RECOVERY FOLLOWING PROLONGED COMPRESSION

[75] Inventor: Jary D. Jensen, Midland, Mich.

[73] Assignee: Dow Corning Corporation, Midland, Mich.

[21] Appl. No.: 289,891

[22] Filed: Dec. 27, 1988

[51] Int. Cl.$^5$ .............................................. C08L 83/04
[52] U.S. Cl. .................................... 524/861; 524/588; 525/478; 528/15; 528/31; 528/32; 528/24
[58] Field of Search ........................ 528/24, 15, 31, 32; 525/478; 524/588, 861

[56] References Cited

U.S. PATENT DOCUMENTS

| | | | |
|---|---|---|---|
| 3,843,601 | 10/1974 | Broner | 260/46.5 |
| 3,892,707 | 7/1975 | Itoh et al. | 260/37 |
| 3,992,355 | 11/1976 | Itoh et al. | 260/46.5 |
| 4,329,275 | 5/1982 | Hatanaka et al. | 524/862 |
| 4,375,523 | 3/1983 | Hatanaka et al. | 523/212 |
| 4,487,906 | 12/1984 | Kniege et al. | 528/15 |

FOREIGN PATENT DOCUMENTS 2049717  12/1980  United Kingdom .

*Primary Examiner*—Melvyn I. Marquis
*Attorney, Agent, or Firm*—Robert Spector

[57] ABSTRACT

The presence of a vinyl-specific peroxide in liquid organosiloxane compositions curable to elastomers by a platinum-catalyzed hydrosiliation reaction imparts excellent recovery properties to the elastomers without requiring post-curing. To avoid premature curing the compositions are preferably stored and transported in at least two parts, where the organohydrogensiloxane curing agent and the hydrosilation catalyst are located in different parts of the composition.

14 Claims, No Drawings

ORGANOSILOXANE COMPOSITIONS YIELDING ELASTOMERS WITH IMPROVED RECOVERY FOLLOWING PROLONGED COMPRESSION

BACKGROUND OF THE INVENTION

1. Field of the Invention

This invention relates to organosiloxane compositions. More particularly, this invention relates to improved organosiloxane compositions that can be cured by a platinum-catalyzed hydrosilation reaction to form elastomers exhibiting superior physical properties relative to prior art elastomers, particularly with respect to their ability to recover a larger percentage of their initial thickness following prolonged compression at temperatures above 100° C. This is achieved without sacrificing other desirable properties such as processability of the curable composition and without the need for post-curing. Preferred compositions are extrudable.

2. Description of the Prior Art

Curable organosiloxane compositions comprising at least one polydiorganosiloxane with at least two silicon-bonded vinyl radicals, an organohydrogensiloxane, a platinum catalyst and a silica filler are well known in the art pertaining to organosiloxane elastomers. It is also known to add peroxides to certain compositions containing a platinum-based catalyst and hydroperoxide as a catalyst inhibitor to accelerate curing at temperatures above about 100° C.

Published British patent application no. 2,049,717 that issued to William Bobear on Dec. 31, 1980 teaches curable organosiloxane elastomer compositions comprising a vinyl-substituted organopolysiloxane, an organohydrogenpolysiloxane, a platinum-containing hydrosilation catalyst, a hydroperoxide to inhibit curing of the composition at room temperature and an organic peroxide to accelerate curing at temperatures above 100° C. Bobear teaches that any organic peroxide will function as a curing accelerator in combination with the hydroperoxide inhibitor. The effect of the organic peroxide on the recovery properties, particularly recovery from long-term compression, is not discussed in this publication.

Organic peroxides can be classified into two categories with respect to the mechanism by which they cure polyorganosiloxanes. One category of peroxides generate acyloxy radicals and function by abstracting hydrogen atoms from any of the silicon-bonded hydrocarbon radicals of the organopolysiloxane, irrespective of whether the hydrocarbon radicals contain terminal ethylenically unsaturated carbon atoms. This category of peroxides are typically referred to as "non vinyl specific", and include benzoyl peroxide and 2,4-dichlorobenzoyl peroxide.

The second category of organic peroxides generate principally tertiary alkyl radicals as initial decomposition products, and are considerably more selective with respect to their ability to abstract hydrogen atoms from hydrocarbon radicals containing terminal ethylenic unsaturation. Using this type of peroxide the number of crosslinks generated during curing approaches the number of vinyl or other terminally unsaturated hydrocarbon radicals present in the curable organosiloxane cmmposition. Vinyl-specific peroxides include t-butyl peroxide, dicumyl peroxide, 2,5-dimethyl-2,5-bis(t-butylperoxy)hexane and 2,5-dimethyl-2,5-bis(t-butylperoxy)hexyne-3.

U.S. Pat. No. 3,843,601, which issued to L. Broner on Oct. 22, 1974 contains a detailed discussion of vinyl-specific and non-vinyl specific peroxides used as curing agents for organosiloxane compositions.

U.S. Pat. No. 4,329,275, which issued to Hatanaka et al. on May 11, 1982 discloses heat curable polysiloxane compositions comprising a polyorganosiloxane containing at least two vinyl radicals per molecule, a polyorganohydrogensiloxane, a platinum-containing catalyst, a phosphorus compound and an organic peroxide. The platinum catalyst and the phosphorus compound can be present in the form of a complex, and the organic peroxide can be of the type referred to as vinyl-specific, which includes aliphatic peroxides such as 2,5-dimethyl-2,5-di(t-butylperoxy)hexane or non-vinyl-specific peroxides such as 2,4-dichlorobenzoyl peroxide. The concentration of peroxide is limited to less than 0.1 part by weight per 100 parts of the vinyl-containing polydiorganosiloxane, and its effect is to control the activity of the platinum catalyst at ambient temperature without detracting from the activity of this catalyst at the higher temperatures used to cure the composition.

Organosiloxane compositions containing organic peroxides as the curing agent typically must be cured by heating them in a confined area such as a mold to prevent premature volatilization of the peroxide with resultant incomplete curing of the organosiloxane composition. This technique is not feasible for those applications where an extrudable organosiloxane composition is applied to the surface of a substrate and allowed to cure under ambient conditions or with the application of heat.

For some end use applications a cured organosiloxane elastomer is intended to function as a seal between the surface of an article to which the curable organosiloxane precursor is initially applied and a surface of a second article which is placed in contact with the cured elastomer. To maintain the integrity of such a seal the dimensions and recovery properties of the cured elastomer layer must not change appreciably with time, even when heated. The extent to which an elastomeric article recovers its initial thickness after being compressed with heating for periods of up to 24 hours or longer is referred to as compression set.

Elastomers prepared from prior art extrudable organosiloxane compositions are typically cured by heating them for five minutes or less at temperatures from 100° to about 200° C. The compression set values for these elastomers are typically greater than 40 percent, measured in accordance with ASTM test procedure D 395. In other words, the difference between the initial thickness of a test sample molded from the elastomer and its thickness following the test is at least 40 percent of the difference between the initial thickness and the thickness to which the sample is compressed during the test.

In accordance with one embodiment of the aforementioned ASTM test method an elastomer sample is compressed to 75 percent of its initial height for a period of 70 hours while heating it at temperatures above about 150o C. The formula for calculating compression set is 100 x (a-b)/(a-c), where a is the initial thickness of the test sample, b represents the thickness of the test sample following completion of the test and c represents the thickness to which the sample is compressed during the test.

To be suitable for use as gaskets and other types of seal-forming materials the compression set value of the cured elastomer should be about 20 percent. Compression set values in this range can typically be achieved only by post-curing, which requires heating the cured elastomer for from 30 to 60 minutes at temperatures of about 200° C.

An objective of this invention is to define a class of liquid organosiloxane compositions that can be rapidly cured to yield elastomers exhibiting the combination of high tear and tensile strengths in addition to compression set values of less than 30 percent, measured using the procedure of ASTM test method D 395. A preferred class of the present compositions are "extrudable", as defined by their ability to be extruded at a rate of at least 45 grams per minute through a 3.175 millimeterdiameter orifice under a pressure of 620 kilopascals (kpa) at 25 degrees C.

SUMMARY OF THE INVENTION

The present inventor has discovered that the aforementioned objective can be achieved using liquid curable organosiloxane compositions comprising at least one vinyl-containing polydiorganosiloxane, an organohydrogensiloxane, a platinum catalyst and at least 0.2 weight percent of an vinyl-specific organic peroxide. The curable composition does not have long-term storage stability and is therefore prepared, transported and stored as a multi-part composition that constitutes one embodiment of this invention.

DETAILED DESCRIPTION OF THE INVENTION

One aspect of this invention provides an improved multi-part organosiloxane composition comprising A. at least one liquid diorganopolysiloxane containing at least two silicon-bonded vinyl radicals per molecule, B. an amount sufficient to cure said composition of an organohydrogensiloxane that is miscible with (A), and contains an average of more than two silicon bonded hydrogen atoms per molecule, C. a platinum-containing hydrosilation catalyst in an amount sufficient to promote curing of said composition at a temperature of from ambient to 250 degrees C., where said organohydrogensiloxane and said hydrosilation catalyst are located in different parts of said multi-part curable composition, and D. from 10 to 60 weight percent, based on the weight of said composition, of a reinforcing silica filler, where the improvement comprises the presence in at least one part of said multi-part composition of at least 0.2 percent, based on the total weight of said curable composition, of a vinyl-specific organic peroxide and for cured elastomers prepared from said composition, a recovery from prolonged compression of at least 90 percent of the initial sample thickness in the absence of post-curing, said recovery being determined in accordance with ASTM test method D395.

A second aspect of this invention encompasses the curable organosiloxane composition obtained by combining the ingredients of the aforementioned multi-part composition and blending them to homogeneity.

A third aspect of this invention provides a method for o improving the compression set of elastomers prepared from liquid organopolysiloxane compositions curable by a platinum-catalyzed hydrosilation reaction without the necessity of post-curing the elastomer, said method comprising including a vinyl-specific organic peroxide as an ingredient of the curable composition.

The presence of a vinyl-specific peroxide characterizes the compositions of this invention and is considered responsible for the excellent recovery properties, particularly recovery from long term compression, of cured elastomers prepared from these compositions is the vinyl-specific peroxide. Test bars molded o from the cured elastomers regain at least 90 percent of their initial thickness after being compressed to 75 percent of their initial thickness for 70 hours while being heated at 150° C. Heretofore this type of recovery from compression could be achieved only by post-curing the cured elastomer at a temperature of 200° C. for between 30 and 60 minutes. The present compositions achieve these properties after being cured for only minutes at temperatures of from 150 to 200° C.

Liquid organosiloxane compositions that cure to form elastomeric materials by a platinum-catalyzed hydrosilation reaction typically include at least one diorganopolysiloxane containing two or more vinyl or other ethylenically unsaturated hydrocarbon radicals per molecule, an organohydrogensiloxane, a reinforcing filler and a platinum catalyst.

As used in this specification the term "ethylenically unsaturated hydrocarbon radical" encompasses hydrocarbon radicals containing at least one non-aromatic double or triple bond between adjacent carbon atoms.

Because curing of these compositions can occur at room temperature even in the presence of a platinum catalyst inhibitor, the long-term storage stability of curable compositions containing both the organohydrogenpolysiloxane and the platinum catalyst is sometimes less than desirable. For this reason the compositions are typically stored and transported in at least two parts. One of these parts includes the organohydrogenpolysiloxane, referred to hereinafter as ingredient B, and a second contains the platinum-containing hYdrosilation catalyst, referred to hereinafter as ingredient C.

To facilitate measuring and blending quantities of the two-part compositions that constitute a preferred embodiment of this invention, both of these parts preferably include a portion of the total amount of at least one vinyl-containing diorganopolysiloxane, referred to hereinafter as ingredient A, and a portion of the reinforcing filler referred to hereinafter as ingredient D.

When the present compositions are packaged in more than two parts, the additional parts typically contain pigments, dyes, catalyst inhibitors and/or any of the other optional ingredients discussed in a subsequent portion of this specification. These additional parts can also include ingredients A and D to facilitate blending of these parts with the remaining parts to form a homogenous curable composition.

The Vinyl-Containing Diorganopolysiloxane (Ingredient A)

The diorganopolysiloxane ingredient of the present compositions can be represented by the general formula I

where each $R^1$ is individually selected from monovalent hydrocarbon radicals and monovalent halohydrocarbon radicals, Vi represents a vinyl radical, and n represents a degree of polymerization equivalent to a viscosity of from 1 to about 200 Pa.s at 25° C.

The two $R^1$ substituents on each silicon atom can be identical or different, and can contain from 1 to about Z0 carbon atoms. A range of from 1 to 10 carbon atoms is preferred based on the availability of the corresponding monomers. Most preferably at least 50 percent of hydrocarbon radicals represented by $R^1$ are methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes.

Representative embodiments of ingredient A containing vinyl radicals only at the terminal positions include but are not limited to dimethylvinylsiloxy-terminated polydimethylsiloxanes, dimethylvinylsiloxy-terminated-polymethyl-3,3,3-trifluoropropylsiloxanes, dimethylvinylsiloxy-terminated -dimethylsiloxane/3,3,3-trifluoropropylmethylsiloxane copolymers and dimethylvinylsiloxy-terminateddimethylsiloxane/methylphenylsiloxane copolymers.

The present compositions can contain a single polydiorganosiloxane as ingredient A. Alternatively two or more polydiorganosiloxanes of different molecular weights can be present. The physical properties of the cured elastomer, particularly resiliency and tear strength, are improved by using a combination of high and low molecular weight diorganopolysiloxanes. In one preferred embodiment the low molecular weight species exhibits a viscosity of from about 0.1 to about 3 Pa.s at 25oC and the high molecular weight species exhibits a viscosity of from 20 to about 70 Pa.s at 25° C.

In particularly preferred embodiments of ingredient A one of the two diorganopolysiloxanes, referred to hereinafter as A1, constitutes from 50 to 95 weight percent of all vinyl-containing diorganopolysiloxanes in the curable composition, exhibits a viscosity of from 1 to 200 Pa.s at 25 degrees C. and contains essentially no ethylenically unsaturated hydrocarbon radicals bonded to non-terminal silicon atoms.

The second of the two vinyl-containing diorganopolysiloxanes, referred to hereinafter as ingredient A2, is a diorganovinylsiloxy terminated polydiorganosiloxane that is miscible with ingredient A1 and exhibits a viscosity of from 0 to 100 Pa.s at Z5 degrees C. Optionally up to 5 mole percent of the non-terminal diorganosiloxane units of ingredient A2 contain a vinyl or other terminally unsaturated hYdrocarbon radical. When ingredient A2 contains a terminally unsaturated hydrocarbon radical it constitutes from 5 to 30 weight percent, based on the total weight of A1 and A2. If A2 contains no unsaturated hydrocarbon radicals bonded to non-terminal silicon atoms it can constitute up to 50 percent or more of the combined weight of ingredients A1 and A2.

The term "essentially no" non-terminal ethylenically unsaturated radicals, used to describe ingredient A1 implies that the only ethylenically and acetylenically unsaturated hydrocarbon radicals present on the non-terminal silicon atoms of this ingredient result from impurities present in the reactants used to prepare this ingredient or from undesired rearrangements occurring during preparation of this ingredient.

Ingredient A1 can be represented by the foregoing general formula I where n represents a degree of polymerization equivalent to a viscosity of from 1 to Z00 Pa.s at 25 degrees C. and none of the hydrocarbon radicals represented by $R^1$ are contain ethylenic or acetylenic unsaturation. In preferred embodiments the viscosity of ingredient A1 is from 20 to 70 Pa.s Ingredient A2 can be represented by the average general formula II $$ViR^{2}{}_{2}SiO(R^{3}{}_{2}SiO)_{y}(ViR^{3}SiO)_{z}SiR^{2}{}_{2}Vi \quad (II)$$

In this formula Vi represents a vinyl radical and $R^2$ and $R^3$ are selected from the same group of monovalent hydrocarbon radicals and substituted monovalent substituted hydrocarbon radicals as $R^1$ in formula I, with the exception of ethylenically unsaturated radicals.

Because ingredients A1 and A2 should be miscible with one another, the silicon bonded hydrocarbon radicals present in these ingredients should be selected from the same class, i.e. these ingredients should be selected from the same class, i.e. lower alkyl. Most preferably at least 50 percent of the hydrocarbon radicals present on A1, A2 and the organohydrogensiloxane (ingredient B) are methyl, with any remainder selected from vinyl, phenyl and 3,3,3-trifluoropropyl, with the limitation stated hereinbefore that A1 does not contain non-terminal ethylenically unsaturated hydrocarbon radicals and ingredient B is free of these unsaturated hydrocarbon radicals.

The degree of polymerization represented by the sum of y and z is equivalent to a viscosity of from 0.1 to 100 Pa.s, preferably from 0.1 to 10 Pa.s at 25 ° C., and the ratio $z/(y+z)$ is from 0 to 0.05, which specifies the requirement for this ingredient that from 0 to 5 mole percent of the non-terminal repeating units contain a vinyl radical. The degree of polymerization of Ingredient A2 is preferably less than the degree of polymerization of Ingredient A1.

To achieve high tear strength without adversely affecting other physical properties of the cured elastomer ingredient A2 constitutes from 5 to 50 percent of the combined weight of ingredients A1 and A2. Compositions containing more than about 50 percent by weight of ingredient A2 yield elastomers with too high a degree of crosslinking if this polymer contains ethylenically unsaturated hydrocarbon radicals bonded to non-terminal silicon atoms. The excessively high degree of crosslinking results in reduced values of compression set, tear strength and tensile strength. Less than about 5 percent by weight of ingredient B will not provide the desired high level of tear strength.

Methods for preparing the liquid polydiorganosiloxanes used as ingredients A, A1 and A2 of the present compositions by hydrolysis and condensation of the corresponding halosilanes or cyclic polydiorganosiloxanes are sufficiently disclosed in the patent and other literature that a detailed description in this specification is not necessary.

The Organohydrogensiloxane Curing Agent (Ingredient B)

The organosiloxane compositions of this invention are cured by a platinum catalyzed hydrosilation reaction. The curing agent is an organohydrogensiloxane containing an average of more than two silicon bonded hydrogen atoms per molecule. This ingredient contains from as few as four silicon atoms per molecule up to an average of 20 or more, and can have a viscosity of up to 10 Pa.s or higher at 25° C. The repeating units of ingredient B include but are not limited to $HSiO_{1.5}$, $R^4HSiO$ and/or $R^4{}_2HSiO_{0.5}$ to one or more of monoorganosiloxy, diorganosiloxane, triorganosiloxy and SiO$_{4/2}$ units. In these formulae R$^4$ represents a monovalent hydrocarbon or halohydrocarbon radical as defined hereinabove for the R$^1$ radical of ingredient A, with the proviso that R$^4$ cannot represent an ethylenically unsaturated hydrocarbon radical.

Alternatively the organohydrogensiloxane can be a cyclic compound containing diorganosiloxane and organohydrogensiloxane units or a compound of the formula Si(OSiR$^4_2$H)$_4$.

For those most preferred embodiments of the present composition wherein the hydrocarbon radicals of ingredients A and B, represented by R$^1$, R$^2$ and R$^3$, are methyl, R$^4$ is methyl and the curing agent is a linear trimethylsiloxy terminated dimethylsiloxane/methylhydrogensiloxane copolymer containing an average of from 10 to about 50 repeating units per molecule, of which from 3 to 5 are methylhydrogensiloxane, or a compound of the formula Si(OSiR$^4_2$H)$_4$ where R$^4$ is lower alkyl, most preferably methyl.

The molar ratio of silicon bonded hydrogen atoms to vinyl or other ethylenically unsaturated hydrocarbon radicals in compositions curable by a hydrosilation reaction is critical with respect to the properties of the cured elastomer. The optimum ratio for the present curable compositions will be determined at least in part bY the molecular weight of ingredient A or the molecular weights of ingredients A1 and A2. This optimum value can readily be determined by those skilled in the art with a minimum of experimentation, and is not part of this invention.

For preferred compositions of this invention the molar ratio of silicon bonded hydrogen atoms to vinyl and/or other ethylenically unsaturated hydrocarbon radicals present in the curable composition is between 1.5 and 3.0.

The platinum Hydrosilation Catalyst (Ingredient C) and Optional Inhibitor

Hydrosilation reactions are typically conducted in the presence of a catalyst that is a platinum group metal or a compound of such a metal. platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoroPropyl are particularly preferred because of their ability to catalyze a rapid curing of the elastomer at temperatures of at least about 70 degrees C.

The platinum containing catalyst (ingredient C) can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life". the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methYl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory working time while not adversely affecting cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

The Vinyl-Specific Organic Peroxide

As discussed hereinbefore, the present compositions contain at least 0.Z percent by weight of a vinyl-specific organic peroxide. The presence of this ingredient is believed responsible for the unique ability of the samples fabricated from the present elastomers to recover at least 85% of their initial thickness following long-term compression. This is achieved without the need for post-curing, which typically involves heating the cured elastomer for at least 30 minutes at a temperature above 150° C.

Preferred vinyl-specific peroxides contain one or more peroxy groups bonded to tertiary alkyl radicals, and include 2,5-dimethyl-2,5-bis(t-butylperoxy)hexane, 2,5-dimethyl-2,5-bis(t-butylperoxy)hexyne-3, t-butylperoxy isopropyl carbonate, and dicumyl peroxide.

Using more than about 3 percent by weight of peroxide has not been shown to provide any additional property improvement, and would be uneconomical an addition to generating undesirable by-products during the curing reaction.

The Silica Filler

To achieve the high levels of tear strength and other physical properties that characterize cured elastomers prepared using the compositions of this invention, the compositions must contain a reinforcing silica filler. The filler is usually treated with any of the known silica treating agents to prevent a phenomenon referred to as "creping" or "crepe hardening" during processing of the curable composition.

Any finely divided form of silica can be used as the reinforcing filler. Colloidal silicas are preferred because of their relatively high surface area, which is typically at least 50 square meters per gram. Fillers having surface areas of at least 300 square meters per gram are preferred for use in the present method. Colloidal silicas can be prepared by precipitation or a fume process.

Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The silica treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the silica to form compounds with silicon-bonded hydroxyl groups. Preferably at least a portion of the silicon bonded hydrocarbon radicals present on the treating agent are identical to a majority of the hydrocarbon radicals present in ingredients A and B.

It is believed that the treating agents function by reacting with silicon-bonded hydroxyl groups present on the surface of the silica particles to reduce interaction between these particles.

Optional Ingredients

In addition to the vinyl-containing polydiorganosiloxanes, curing agent, platinum-containing catalyst, organic peroxide and reinforcing silica filler the organosiloxane compositions of this invention can contain one or more additives that are conventionally present in curable compositions of this type. These materials are added to impart or enhance certain properties of the cured elastomer or facilitate processing of the curable composition. A small amount of water can be added together with the silica treating agent(s) as a processing aid.

Typical additives include but are not limited to pigments, dyes, adhesion promoters, flame retardants, heat and/or ultraviolet light stabilizers and resinous organosiloxane copolymers to enhance the physical properties of the cured elastomer.

A preferred type of resinous copolymer contains repeating units of the general formula $SiO_{4/2}$ in addition to triorganosiloxy units of the general formulae $R^5_3SiO_{1/2}$ and diorganovinylsiloxy units of the general formula $CH_2°CH(R^6)_2SiO_{1/2}$. In these formulae $R^5$ and $R^6$ are individually monovalent hydrocarbon or substituted monovalent hydrocarbon radicals as previously defined for the $R^1$ radicals of ingredient A.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy:$SiO_{4/2}$ units is 0.08–0.1 : 0.06–1 : 1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^1$ and $R^2$ in the foregoing formula.

Preparation of Multi-Part Compositions Of This Invention

The filler is preferably treated in the presence of at least a portion of the other ingredients of the present compositions bY blending these ingredients together until the filler is completely treated and uniformly dispersed to form a homogeneous material.

The ingredients that are present during treatment of the silica typically include the silica treating agents and at least a portion of the diorganopolysiloxanes referred to herein as ingredients A, A1 and A2.

As discussed hereinbefore, one part of the two part compositions that constitute a preferred embodiment of the multipart compositions of this invention contains the organohydrogensiloxane (ingredient B) in addition to ingredients A and D, while the second part contains the platinum-containing catalyst, ingredient C. Ingredients B and C are typically added after treatment of the silica and addition of ingredient A or a mixture of A1 and A2.

Irrespective of the type of mixer used, blending of the silica, filler treating agent(s) and diorganopolysiloxanes is continued while the composition is heated at temperatures from about 100° to 250° C. under reduced pressure to remove volatile materials. The resultant product is then cooled prior to being blended with the organohydrogensiloxane and/or the platinum catalyst, depending upon whether it is desired to prepare a one-part or two-part curable composition of this invention. The optional additives referred to hereinbefore can be added at this time or during treatment of the silica.

In-situ treatment of the silica requires anywhere from 15 minutes to 2 hours, depending upon the amount of material being processed, the viscosity of the material and the shear rate to which the material is subjected during processing.

Alternatively, treatment of the silica can occur before the silica is blended with other ingredients of the present compositions. Methods for treating finely divided silica fillers prior to incorporating the silica into a polyorganosiloxane composition are known in the art.

To ensure adequate blending of all ingredients the mixing equipment in which the present compositions are prepared should be capable of subjecting the composition to a high rate of shear. The advantage of using this type of a "high intensity" mixer to prepare silica filled polyorganosiloxane compositions is taught in U.S. Pat No. 3,690,804, which issued to Minuto on June 1, 1976. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with "sigma" shape blades, are not as efficient as mixers wherein the mixing surfaces are of a relatively flat "paddle" configuration. Examples of the paddle type mixers include the Henschel mixer disclosed in the aforementioned Minuto patent and certain mixers manufactured by Neulinger A.G. The blade is preferably rotated at a speed of at least 100 revolutions per minute.

Curable compositions of this invention typically exhibit viscosities of about 0.5 up to about 1000 Pa.s at 25 degrees C. To facilitate blending and transfer of the compositions and minimize entrapment of air during mixing a viscosity of less than about 10 Pa.s at 25 degrees C. is preferred. particularly for extrudable compositions.

Fabrication and Curing of Shaped Articles

The present curable compositions can be formed into shaped articles by press molding, injection molding, extrusion, or any of the other methods used to fabricate organosiloxane compositions.

In the absence of one of the aforementioned catalyst inhibitors the compositions will cure at ambient temperature over a period of several hours or days, or within in several minutes when heated at temperatures of up to 250 degrees C. Compositions oontaining one of these catalyst inhibitors are typically cured by heating them for several minutes at temperatures of from 50 to about 250 degrees C. A preferred range is from 100 to 200 degrees C.

As discussed hereinbefore cured elastomeric articles prepared using the curable compositions of this invention unexpectedly high recovery from long-term compression conducted at temperatures of at least 100° C. without the need for post-curing. This unique combination of properties make the elastomers desirable for a number of end use applications, including gaskets and fabricated articles wherein at least a portion of the article is relatively thin and subjected to large amounts of stress. Articles of this type include diaphragms and bladders.

The following example describes preferred curable compositions of this invention and the properties of elastomers prepared by curing these compositions. The example is intended to illustrate the present invention and should not be interpreted as limiting the invention as defined in the accompanying claims. Unless indicated to the contrary all parts and percentages are by weight and all viscosities were measured at 25° C.

EXAMPLE 1

Curable organosiloxane compositions were prepared using 70 parts of a first dimethylvinylsiloxy terminated polydimethylsiloxane exhibiting a viscosity of about 5 Pa.s (A1), 30 parts of a second dimethylvinylsiloxy terminated polydimethylsiloxane exhibiting a viscosity of about 0.4 Pa.s (A2), 1.9 parts of water, and 36.0 parts of a fume silica filler (type S-17 supplied by Cabot Corporation). The silica treating agents consisted of 1.2 parts of a hydroxyl terminated dimethylsiloxane/methylvinylsiloxane copolymer containing about 10 weight percent of vinyl radical, 1.4 parts of a hydroxyl terminated polydimethylsiloxane fluid having a viscosity of about 0.04 Pa.s and containing about 4 weight percent of siliconbonded hydroxyl groups and 16 weight percent of hydroxyl radical (B), and 7.7 parts of hexamethyldisilazane (C).

The compositions were prepared by combining 46 parts of ingredient (A1), all of ingredients (B) and (C), and all of the water in a dough type mixer and blending the resultant composition to homogeneity under ambient conditions, which required about 30 minutes. At this time all of the fume silica was added and blended into the mixture. The resultant composition was blended for one hour while the jacket of the mixer was heated to a temperature of 150° C. and the chamber of the mixer was maintained under a reduced pressure of 20.3 kPa. At the end of the heating cycle 24 parts of (A1) and 30 parts of (A2) were added, and the composition was then blended in the mixer for an additional hour under ambient conditions.

The resultant composition was cooled and divided into three equal parts. One of the parts was combined with 2.3 parts of a trimethylsiloxy-terminated Polyorganosiloxane having an average of five methylhydrogensiloxane units and three dimethylsiloxane units per molecule and containing from 0.7 to 0.8 weight percent of silicon-bonded hydrogen atoms. 0.023 part of 2-methyl-3-butyn 2-ol and 0.3 part of 2,5-bis(t-butylperoxy)2,5-dimethylhexane. For purposes of comparison the same ingredients with the exception of the peroxide were added to the second part of the composition.

The third part of the composition was combined with 0.14 part of a reaction product of hexachloroplatinic acid and sym-tetramethyldivinyldisiloxane that had been diluted with a liquid trimethylsiloxy terminated polydimethylsiloxane in an amount sufficient to achieve a platinum content of 0.7 weight percent.

Either the first or second composition was combined with an equal weight of the composition containing the hexachloroplatinic acid and blended to homogeneity.

The amount of ingredient organohydrogensiloxane was equivalent to a molar ratio of silicon bonded hydrogen atoms to vinyl radicals in the total curable composition of 1.8.

The resultant curable compositions were cured in the form of sheets having a thickness of 1.9 mm. by placing the compositions between the platens of a hydraulic press and heating them for 10 minutes at a temperature of 177° C. Test samples were then cut from each of the sheets to determine the physical properties of the cured materials.

The American Society of Testing procedures (ASTM) methods used to measure the various properties evaluated included D 412 for tensile strength, D 625, Die B for tear strength, D 2240. Shore A scale for durometer hardness values and D 395 for compression set. The conditions for the compression set test were heating the test sample for 70 hours at a temperature of 150° C. while compressing the sample to 75 percent of its initial thickness.

The physical properties of the cured compositions are summarized in Table 1. The compression set values represent the average of five samples.

TABLE 1

| Sample No. | Tensile Strength (mPa) | Compression Set (%) | Tear Strength kN/m | Hardness (Shore A) |
|---|---|---|---|---|
| 1 | 8.97 | 12.0 | 28.6 | 47.6 |
| 2* | 9.13 | 36.7 | 33.4 | 44.4 |

*Included for purposes of comparison; did not contain any peroxide.
Sample 1 contained 2,5-bis(t-butylperoxy)-2,5-dimethylhexane as the vinyl-specific peroxide The data in Table 1 demonstrate that by using the curable compositions of this invention, which contain a vinyl-specific organic peroxide, the compression set of the cured elastomers is substantially improved relative to compositions cured in the absence of the peroxide without adversely affecting other desireable properties such as tensile strength, tear strength and hardness.

That which is claimed is:

1. In an improved multi-part organosiloxane composition comprising
   A. at least one liquid diorganopolysiloxane containing at least two silicon-bonded vinyl radicals per molecule,
   B. an amount sufficient to cure said composition of an organohydrogensiloxane that is miscible with (A), and contains an average of more than two silicon bonded hydrogen atoms per molecule,
   C. a platinum-containing hydrosilation catalyst in an amount sufficient to promote curing of said composition at a temperature of from ambient to 250 degrees C., where said organohydrogensiloxane and said hydrosilation catalyst are located in different parts of said multi-part curable composition, and
   D. from 10 to 60 weight percent, based on the weight of said composition, of a reinforcing silica filler, the improvement comprising (1) the presence in at least one part of said multi-part composition of at least 0.2 percent, based on the total weight of said composition, of a vinyl specific organic peroxide and (2) for cured elastomers prepared from said composition, a recovery from prolonged compression of at least 90 composition of the initial sample thickness in the absence of post-curing, said recovery being determined in accordance with ASTM test method D395.

2. A composition according to claim 1 where said vinyl-specific peroxide is selected from the group consisting of 2,5-dimethyl-2,5-bis(t-butylperoxy)hexane, 2,5-dimethyl-2,5-bis(t-butylperoxy)hexyne, and dicumyl peroxide; said peroxide constitutes from 0.2 to 3 weight percent of said composition; said diorganopolysiloxane is represented by the average general formula

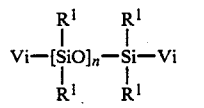

where each $R^1$ is individually selected from the group consisting of monovalent hydrocarbon radicals and monovalent halohydrocarbon radicals and contains from 1 to 20 carbon atoms, Vi represents a vinyl radical, and n represents a degree of polymerization equivalent to a viscosity of from 1 to about 200 Pa.s at 25° C., the organohydrogensiloxane is represented by the formula $Si(OSiR^4{}_2 H)_4$ or comprises repeating units selected from the group consisting of $HSiO_{1.5}$, $R^4HSiO$ and $R^4{}_2HSiO_{0.5}$, where $R^4$ is selected form the same group as $R^1$, with the proviso that $R^4$ cannot represent an ethylenically or acetylenically unsaturated hydrocarbon radical; and said composition is in two parts, both of which contain at least one liquid diorganopolysiloxane and said reinforcing silica filler.

3. A composition according to claim 1 where said composition contains two of said diorganopolysiloxanes, A1 and A2, where A1 exhibits a viscosity of from 1 to 200 Pa.s at 25° C. and is represented by the formula

each $R^1$ is individually selected from the group consisting of monovalent hydrocarbon radicals and monovalent halohydrocarbon radicals that are free of ethylenic or acetylenic unsaturation and contains from 1 to 20 carbon at©ms, Vi represents a vinyl radical, and n represents a degree of polymerization equivalent to a viscosity of from 0.1 to about 100 Pa.s at 25 oC , A1 constitutes from 50 to 95 percent of the combined weight of A1 and A2, A2 is represented by the general formula $$ViR^2{}_2SiO(R^3{}_2SiO)_y(ViR^3SiO)_zSiR^2{}_2Vi \qquad (II)$$

where Vi represents a vinyl radical and $R^2$ and $R^3$ are selected from the same group as $R^1$, with the proviso that $R^2$ and $R3$ do not contain ethylenic unsaturation, the degree of polymerization represented by the sum of y and z is equivalent to a viscosity of from 0.1 to 100 Pa.s at 25° C., and the ratio $z/(y+z)$ is from 0 to 0.05; the molar ratio of silicon-bonded hydrogen atoms to ethylenically unsaturated hydrocarbon radicals in said composition is from 1.5 to 3.0; the organohydrogensiloxane is represented by the formula $Si(OSiR^4{}_2 H)_4$ or comprises repeating units selected from the group consisting of $HSiO_{1.5}$, $R^1$; and $R^4{}_2HSiO_{0.5}$, where $R^4$ is selected form the same group as $R^1$; and said composition is in two parts, both of which contain at least one liquid diorganopolysiloxane and said reinforcing silica filler; the concentration of said hydrosilation catalyst is equivalent to a platinum content of from 5 to 50 parts by weight per million parts by weight of said composition, and said composition includes an inhibitor for said hydrosilation catalyst.

4. A composition according to claim 3 where A1 exhibits a viscosity of from 20 to 70 Pa.s at 25° C. and A2 exhibits a viscosity of from 0.1 to 10 Pa.s at 25° C.

5. A composition according to claim 4 where at least 50 percent of the radicals represented by $R^1$, $R^2$, $R^3$ and $R^4$ are methyl and any remaining radicals are selected from the group consisting of phenyl and 3,3,3-trifluoropropyl; said composition contains from 30 to 50 weight percent of reinforcing silica filer; the peroxide is 2,5-dimethyl-2,5-bis(t-butylperoxy)hexane; and said catalyst inhibitor is 2-methyl-3-butyn-2-ol.

6. A composition according to claim 5 where each of $R^1$, $R^2$, $R^3$ and $R^4$ are methyl, and said organohydrogensiloxane is a trimethylsiloxy terminated dimethylsiloxane/methylhydrogen-siloxane copolymer containing an average of from 10 to about 50 repeating units per molecule, of which from 3 to 5 are methylhydrogensiloxane, or a compound of the formula Si(OSiR⁴₂H)₄ where R4 is methyl.

7. A composition according to claim 6 where said reinforcing filler is treated with an anti-creping agent, said composition exhibits a viscosity of from 0.5 to 100 Pa.s at 25° C. and is extrudable.

8. A method for achieving greater than a 90% thickness recovery, measured in accordance with ASTM test method D 395, following compression of an elastomer prepared from a curable organosiloxane composition without the necessity of post-curing said elastomer, where said curable composition comprises A. at least one liquid diorganopolysiloxane containing at least two silicon-bonded vinyl radicals per molecule,
B. an amount sufficient to cure said composition of an organohydrogensiloxane that is miscible with (A) and contains an average of more than two silicon bonded hydrogen atoms per molecule,
C. a platinum-containing hydrosilation catalyst in an amount sufficient to promote curing of said composition at a temperature of from ambient to 250 degrees C., and
D. from 10 to 60 weight percent, based on the weight of said composition, of a reinforcing silica filler, where said method comprises adding to said composition at least 0.2 percent, based on the weight of said composition, of a vinyl-specific organic peroxide 9. A method according to claim 8 where said vinyl-specific peroxide is selected from the group consisting of 2,5- dimethyl-2,5-bis(t-butylperoxy)hexane, 2,5-dimethyl 1-2,5-bis(t-butylperoxy)hexyne, and dicumyl peroxide; said peroxide constitutes from 0.2 to 3 weight percent of said composition; the diorganopolysiloxane is represented by the average general formula

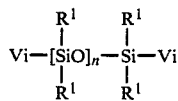 (I)

where each R¹ is individually selected from the group consisting of monovalent hydrocarbon radicals and monovalent halohydrocarbon radicals and contains from 1 to 20 carbon atoms, Vi represents a vinyl radical, and n represents a degree of polymerization equivalent to a viscosity of from 1 to about 200 Pa.s at 25° C., the organohydrogensiloxane is represented by the formula Si(OSiR⁴₂H)₄ or comprises repeating units selected from the group consisting of HSiO₁.₅, R⁴HSiO and R⁴₂HSiO₀.₅, where R⁴ is selected from the same group as R¹, with the proviso that R⁴ cannot represent an ethylenically unsaturated hydrocarbon radical; said composition is in two parts, both of which contain at least one liquid diorganopolysiloxane and said reinforcing silica filler, with the proviso that said organohydrogensiloxane and said hydrosilation catalyst are located in different parts of said composition.

10. A method according to claim 8 where said composition contains two of said diorganopolysiloxanes, A1 and A2, where Al exhibits a viscosity of from 1 to 200 Pa.s at 25° C. and is represented by the formula

 (I)

each R¹ is individually selected from the group consisting of monovalent hydrocarbon radicals and monovalent halohydrocarbon radicals that are free of ethylenic or acetylenic unsaturation and contains from 1 to 20 carbon atoms, Vi represents a vinyl radical, and n represents a degree of polymerization equivalent to a viscosity of from 0.1 to about 100 Pa.s at 25° C., A1 constitutes from 50 to 95 percent of the combined weight of A1 and A2, A2 is represented by the general formula

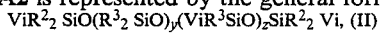
ViR²₂ SiO(R³₂ SiO)ᵧ(ViR³SiO)₂SiR²₂ Vi, (II)

where Vi represents a vinyl radical and R² and R³ are selected from the same group as R¹, with the proviso that R² and R³ do not contain ethylenic unsaturation, the degree of polymerization represented by the sum of y and z is equivalent to a viscosity of from 0.1 to 100 Pa.s at 25° C., and the ratio z/y+z) is from 0.01 to 0.05; the molar ratio of silicon-bonded hydrogen atoms to ethylenically unsaturated hydrocarbon radicals in said composition is from 1.5 to 3.0; the organohydrogensiloxane is represented by the formula Si(OSiR⁴₂H)₄ or comprises repeating units selected from the group consisting of HSiO₁.₅, R⁴HSiO and R⁴₂HSiO₀.₅, R⁴ is selected form the same group as R¹; said composition is in two parts, both of which contain at least one liquid diorganopolysiloxane and said reinforcing silica filler; the concentration of said hydrosilation catalyst is equivalent to a platinum content of from 5 to 50 parts by weight per million parts by weight of said composition, and said composition includes an inhibitor for said hydrosilation catalyst.

11. A method according to claim 10 where A1 exhibits a viscosity of from 20 to 70 Pa.s at 25° C. and A2 exhibits a viscosity of from 0.1 to 10 Pa.s at 25° C.

12. A method according to claim 10 where at least 50 percent of the radicals represented by R¹, R², R³ and R⁴ are methyl and any remaining radicals are selected from the group consisting of phenyl and 3,3:3-trifluoropropyl; said composition contains from 30 to 50 weight percent of reinforcing silica filer; the peroxide is 2,5-dimethyl-2,5-bis(t-butylperoxy)hexane; and said catalyst inhibitor is 2-methyl-3-butyn-2-ol.

13. A method according to claim 12 where each of R¹, R², R³ and R⁴ are methyl, and said organohydrogensiloxane is a trimethylsiloxy terminated dimethylsiloxane/methylhydrogen-siloxane copolymer containing on average of from 10 to about 50 repeating units per molecule, of which from 3 to 5 are methylhydrogensiloxane units, or a compound of the formula Si(OSiR⁴₂H)₄ where R⁴ is methyl 14. A method according to claim 13 where said reinforcing filler is treated with an anti-creping agent, said composition exhibits a viscosity of from 0.5 to 100 Pa.s at 25° C. and is extrudable.

* * * * *